United States Patent [19]
Maxwell

[11] 3,844,699

[45] Oct. 29, 1974

[54] INJECTION MOLDING MACHINE WITH A ROTARY PLUNGER AND ROD MIXING AND WORKING CHAMBER

[76] Inventor: Bryce Maxwell, 19 McCosh Cir., Princeton, N.J. 08540

[22] Filed: Sept. 11, 1973

[21] Appl. No.: 396,140

Related U.S. Application Data
[63] Continuation of Ser. No. 204,514, Dec. 3, 1971, abandoned.

[52] U.S. Cl................ 425/207, 425/242, 425/245, 425/381.2
[51] Int. Cl............................................. B29f 1/02
[58] Field of Search ......... 425/381.2, 207, 209, 242

[56] References Cited
UNITED STATES PATENTS
| | | | |
|---|---|---|---|
| 2,986,776 | 6/1961 | Frohring | 425/245 X |
| 3,355,764 | 12/1967 | Moyer | 425/381.2 |
| 3,695,575 | 10/1972 | Hauser | 425/207 |

FOREIGN PATENTS OR APPLICATIONS
| | | | |
|---|---|---|---|
| 1,185,366 | 1/1965 | Germany | 425/381.2 |

*Primary Examiner*—Andrew R. Juhasz
*Assistant Examiner*—David S. Safran
*Attorney, Agent, or Firm*—Sperry and Zoda

[57] ABSTRACT

An apparatus and method are herein provided for simultaneously melting and mixing polymer materials for injection molding. The material, to be molded, is substantially entrapped between opposing surfaces of a retaining member and a radial face of a rotatable plunger member. A rod like projection may be presented to extend normally from the, material engaging, radial face of the plunger member. Additionally, a reciprocating action may be imparted to the plunger member to enhance the mixing and homogenizing action thereof, in preparation for the injection of the material into a suitable mold.

5 Claims, 7 Drawing Figures

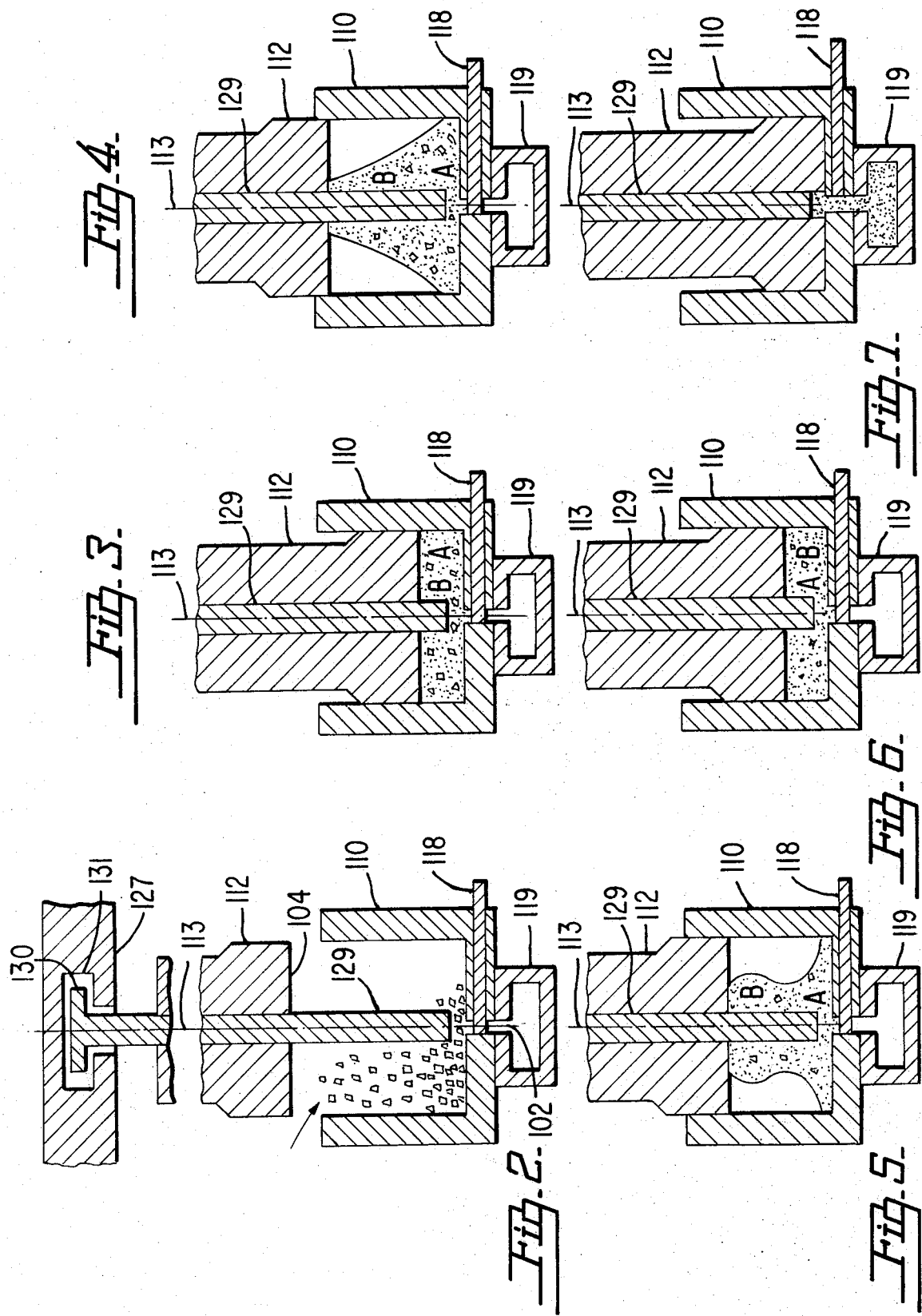

INJECTION MOLDING MACHINE WITH A ROTARY PLUNGER AND ROD MIXING AND WORKING CHAMBER This application is a continuation of applicant's copending application Ser. No. 204,514 filed Dec. 3, 1971, now abandoned.

FIELD OF INVENTION

The present invention relates to the injection molding of non-homogeneous feed materials.

Injection molding often involves the melting and mixing of diverse feed materials and the subsequent injection of the resulting mass into a die, or mold, to form the mass into a shaped piece. The present invention is particularly directed to an improved apparatus and method for the injection molding of polymer materials such as plastics and rubbers, which require thorough mixing. Of course, the apparatus and method, of the present invention, may also be used for the injection molding of non-polymeric materials such as waxes, glasses and candies.

Injection molding is a well established processing and fabrication procedure in the polymer materials industry. See, for example, the 1970–1971 edition of Modern Plastics Encyclopedia, McGraw Hill, Inc., New York, New York, pp. 540–555. Two general methods of injection molding are commonly practiced today.

The first method, characterized as "plunger injection molding," contemplates the use of a non-rotating, cold plunger member to force a polymer material through a heated cylinder wherein the polymer is heated by heat conducted from the walls of the cylinder to the material. In this first method of injection molding, the cold plunger is always disposed so as to push against newly introduced cold, feed material.

The second method, characterized as "reciprocating screw extruder injection molding," contemplates the use of a rotating screw, disposed co-axially of a heated barrel, for conveying the feed material toward a first end of the screw and to heat the material by the conduction of heat from the heated barrel to the material. As the material is conveyed by the screw mechanism toward the first end, the screw is translated toward the second end so as to produce a reservoir space at the first end. When sufficient melted material is collected in the reservoir space, the screw mechanism is pushed toward the first end so as to inject the material into a selected mold.

Although such existing methods are satisfactory for molding pieces, using an already homogenized feed material, such methods and related apparatus are sorely inadequate when it is desired to produce homogenous pieces using diverse, unmixed, feed material components.

OBJECTS AND SUMMARY OF THE INVENTION

It is therefore an object of the present invention to provide an apparatus and method for forming homogeneous molded pieces, by injection molding, using non-homogeneous feed materials.

It is another object of the present invention to provide an apparatus and method for forming homogeneous pieces, by injection molding, which apparatus and method are more economical than existing such methods and apparatus.

It is still another object of the present invention to provide a method and apparatus for forming homogeneous pieces, by injection molding, which apparatus and method are sufficiently uncomplicated as to require a minimum of training for personnel practicing the method or utilizing the apparatus.

It is yet another object of the present invention to provide a method and apparatus for forming homogeneous pieces, by injection molding, which apparatus and method contemplate the simultaneous heating and mixing of non-homogeneous feed materials.

It is a further object of the present invention to provide an apparatus and a method for forming homogeneous pieces, by injecting molding, which apparatus and method solve many of the problems confronting the plastics industry, today.

At least some of the above cited objects are achieved by the provision of an apparatus and method wherein feed material may be introduced into a heated, retaining member and then may be entrapped within a substantially enclosed space defined by the internal surface of the retainer and a radial face of a plunger member, insertable through an open portion of the retaining member. The plunger member may be rotated to sheer the material disposed in the last mentioned space to impart a mixing and melting action thereto. Additionally, the plunger member may be axially reciprocated, with respect to the retaining member, to enhance the mixing action.

In one feature of the invention, a rod like projection may be formed on the material engaging face of the rotatable plunger member to further enhance the mixing action provided by the inter-cooperation of the plunger and the retaining member.

In another feature of the invention, a mixed material outlet may be formed in the retaining member. When the melting and mixing operation has been completed, the outlet may be opened and the material forced from the retainer and injected into a suitable mold by the action of the plunger member.

BRIEF DESCRIPTION OF THE DRAWINGS

While the invention is particularly pointed out and distinctly claimed in the concluding portion of the specification, several embodiments of the present invention are set forth in the following detailed description which may be best understood when read in connection with the accompanying drawings in which:

FIG. 2 is a vertical sectional view of another embodiment of the injection molding apparatus of the present invention illustrating a first step in the sequence of operation, wherein feed material is being introduced into the apparatus;

FIG. 3 is a transverse sectional view of the apparatus shown in FIG. 2 illustrating a second step in the sequence of operation, wherein a plunger member is being moved axially toward a feed material retaining member;

FIG. 4 is a transverse sectional view of the apparatus shown in FIG. 2 illustrating a third step in the sequence of operation, wherein the plunger member is being moved away from the feed material retaining member and is being siluntaneously rotated;

FIG. 5 is a transverse sectional view of the apparatus shown in FIG. 2 showing a fourth step in the sequence of operation, wherein the plunger member is being moved toward the retaining member;

FIG. 6 is a transverse sectional view of the apparatus shown in FIG. 2 showing a fifth step in the sequence of operation, wherein the feed material has been properly heated and mixed;

FIG. 7 is a transverse sectional view of the apparatus shown in FIG. 2 illustrating a sixth step in the sequence of operation, wherein the mixed material is being forced out of the retaining member and is being injected into a mold.

DETAILED DESCRIPTION

Figure 1:
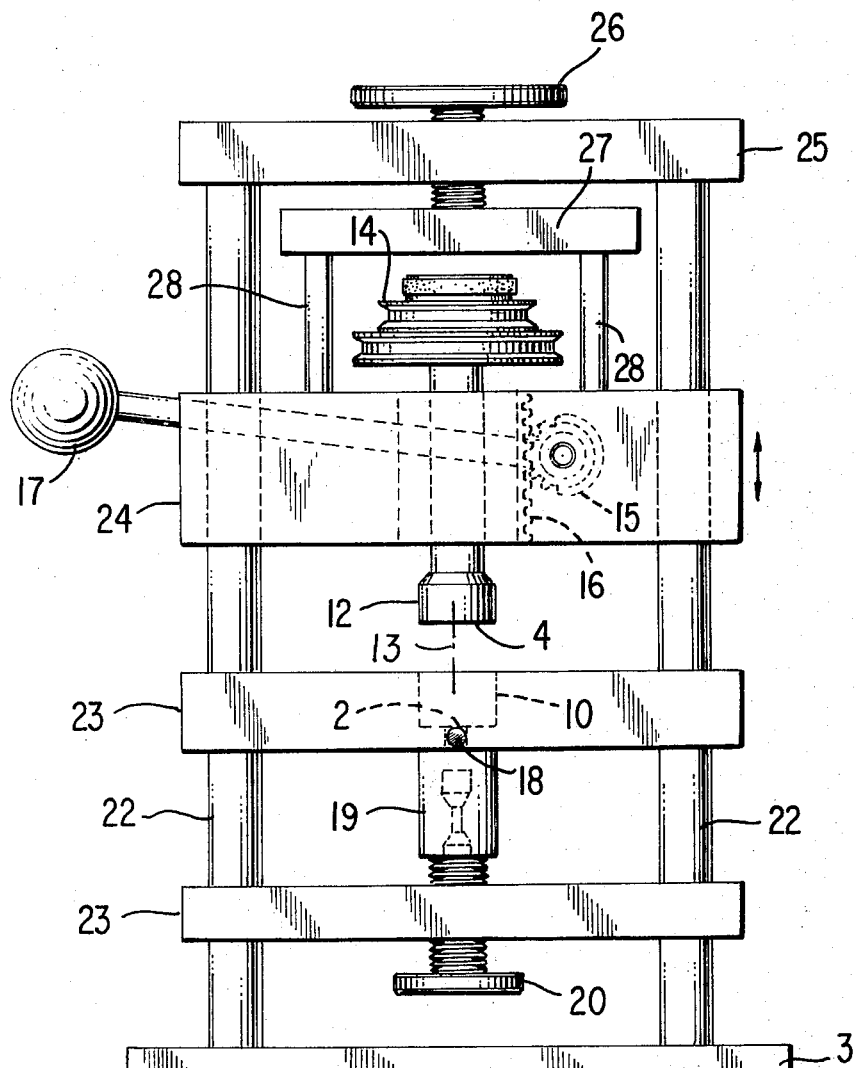
FIG. 1 is a front elevation view of one embodiment of the injection molding apparatus according to the present invention.

Referring now to the drawings, in which related numbers are utilized to indicate corresponding parts, FIG. 1 shows one embodiment of the present invention to include a retaining cup 10 and a rotatable and axially movable plunger member 12.

The retaining cup 10 may be heated by any conventional means, such as by electrical resistance heaters 11 or by fluid heat transfer liquids. The plunger member 12 may, similarly, be heated and may be rotated about its axis by a pully 14 mounted on the plunger 12 and extending in the radial plane thereof.

Any conventional driving mechanism, such as an electric motor, may be utilized to rotate the plunger member 12 through a direct drive arrangement, utilizing the pully 14.

The plunger member 12 may be reciprocated along its axis 13 by a rack and pinion arrangement comprising a pinion 15 and rack 16. A lever member 17 is operatively connected with the pinion 15 and is disposed for cooperation with the rack 16 to raise and lower the plunger member 12, in response to the arcuate movement thereof.

A valve 18 may be disposed in an outlet 2 formed to extend between the retaining cup member 10 and a mold 19. The valve 18 is operable to control the exit of mixed material from within the retaining member 10 through the outlet passage 2, to the mold 19, wherein the material is formed into a desired shape.

A mold clamping system 20 may be provided, comprising a press screw arrangement. Post elements 22 may be vertically mounted upon a base member 3 for supporting horizontally extending fixed frame elements 23 and 25. A screw lever system 26 may be operatively supported within horizontally extending elements 25 for moving element 24 in a vertical direction which element 24 may be connected with the screw member 26 through horizontally extending member 27 and vertically extending members 28 depending from element 27.

While the adjustable horizontal member 24 may be positioned by the operation of the screw lever system 26, the plunger member 12 may be, in turn, vertically adjusted by the operation of the rack and pinion system operatively mounted on the movable element 24 and operative in response to the movement of the lever handle 17.

In practicing the present invention, using the apparatus of FIG. 1, the valve 18 is closed and the retaining member 10 and plunger 12 are heated to a temperature which will cause a polymer material to be softened.

A charge of polymer feed material is introduced into the retaining cup 10 and the screw lever system 26 is operated to move the plunger 12 downwardly into the retaining cup 10, through an upper opening defined therein.

The cross sectional area of the plunger 12 and the inside diameter of the feed material retaining cup 10 are sized so that the material engaging surface 4 of the plunger 12 cooperates with the inside surfaces of the retaining cup 10 to entrap the polymer material in a substantially enclosed space defined by the internal surfaces of the cup 10 and by the surface 4 of the plunger 12.

After the feed material has been entrapped within the last mentioned space, the plunger 12 is rotated by means of torque applied to the pully 14, which torque may be imparted to the pully by any suitable source such as an electric motor.

While the plunger 12 is being rotated, it may be translated upwardly by the operation of the handle lever 17 which actuates the rack 16 and the pinion 15.

After the plunger member 12 has been raised, it is again lowered into the cup portion 10 and is alternately raised and lowered, in a reciprocating movement, to improve the mixing of the feed material and to permit the venting of any volatile materials, when the plunger member 12 is raised out from within the cup portion 10. The volatile materials may be generated due to the heating of the feed material.

During this overall procedure, the polymer material is softened and melted, due to the conduction of heat from the surfaces of the retaining cup 10 and the plunger member 12. Furthermore, due to the mechanical working of the material and the resulting input of frictional energy, provided by the shearing action imparted to the material by the surface 4 of the rotating plunger 12, additional heat is generated.

After the polymer material has been thoroughly mixed, melted, and homogenized, the prepared material is ready for injection molding. The valve 18 may then be opened so as to clear the passage 2, extending between the cup portion 10 and the mold 19. The plunger member 12 may then be forced downwardly, while still rotating, by means of the lever handle 17, which, in turn, actuates the rack 16 and pinion 15 to inject the polymer material into the mold 19.

After the polymer material has hardened within the mold 19, the mold may be opened and the product removed therefrom. The plunger member may then be restored to an upper position by the operation of the screw lever system 26 and the valve 18 may be closed in preparation for the next cycle.

Referring now to FIG. 2, the embodiment of the present invention is illustrated in transverse cross section.

A cup like member 110 is provided to cooperate with a plunger member 112 and a valve 118 is disposed within an outlet passage way 102 communicating the interior of the cup member 110 with the interior of an injection mold 119.

A rod like projection 129 is provided to extend axially of the plunger 112 and to project downwardly, normal to the face 104, so as to be extendable into the space defined by the cup like portion 110. The central rod like member 129 may be keyed within the plunger member 112 so as to be axially movable with respect thereto while being rotatable therewith.

When the rod like member 129 is in an extended position, it may be positioned in close proximity to a bottom surface of the cup member 110. The vertical movement of the rod like member 129 may be arrested by the cooperation of a flange 130, extending radially at an upper end of the rod like member 129, which flange 130 may be held within a bearing 131 formed within a frame element 127.

The functioning and purpose of the rod like member 129 will be apparent from a description of the sequence of operation of the embodiment set forth in FIG. 2.

The sequence of operation and the functioning of the apparatus set forth in FIG. 2 is illustrated by way of FIGS. 3 through 7.

Referring now to FIG. 2, the cycle is initiated by the introduction of polymer feed material into the cup 110, which may be heated as discussed previously. The plunger 112 may be rotated and forced downwardly so as to entrap the polymer feed material in the space defined between the surface 104 of the plunger and the internal surfaces of the cup like retainer 110. This step, in the sequence, is shown in FIG. 3.

As the polymer material is softened, the rotating plunger 112 may be raised, as shown in FIG. 4, and the semimolten polymer material rises or "climbs" up the rotating central rod like members 129 as shown in FIG. 4, due to a "normal force effect." The plunger 112 is subsequently forced downwardly, again, as shown in FIGS. 5 and 6. This raising and lowering of the plunger member 112 may be repeated several times in a reciprocating fashion and as desired. When the polymer material has been thoroughly melted and mixed, the valve 118 may be opened and the mixed polymer material injected through the passage way 102 into the mold 119 by forcing the plunger 112 downwardly as illustrated in FIG. 7.

The function of the rotating central rod like member 129 can be understood by consideration of the motion of particle points "A" and "B" in the mass of polymer material represented in FIGS. 3, 4, 5, and 6.

In FIG. 3, particle "A" is radially outwardly of particle point "B." When the plunger 112 is raised, as shown in FIG. 4, particle point "B" is displaced upwardly along the rotating central rod member 129 due to the "normal force effect" and particle point "A" moves radially inwardly, as further depicted in FIG. 4.

When the plunger member 112 is then moved downwardly, as shown in FIG. 5, the particle point "B" is forced radially outwardly. Upon the downward stroke of the plunger 112, as shown in FIG. 6, the point "B" is radially outwardly disposed with respect to the particle point "A."

The relative positions of particle points "A" and "B" have thus been interchanged in response to the particular currents set up in the material due to the forces imparted by the cooperation of the plunger 112 with the rod like member 129.

By this utilization of the "normal force effect" induced by the rotation of the central rod like member 129, radial mixing of a "folding back" nature is provided over and above the normal mixing which would be achieved by the simple rotational shear forces imparted to the material by the cooperation of the surface 104 of the rotating plunger 112 and the internal surfaces of the relatively stationery cup 110.

Additionally, it should be noted that, in each of the embodiments of the present invention, the rotation of the plunger member, during the injection step, assists the injection of the melted polymer material into the mold due to a centripetal pumping effect similar to that provided by an "elastic melt extruder" as disclosed by the present inventor in U.S. Pat. No. 3,046,603, issued on July 31, 1962.

The centripetal pumping effect causes the melted polymer material to move toward the central outlet passage 102 of the cup 110 and, thence, into the mold 119 so as to reduce the required downward force to be applied by the plunger 112 for properly performing the injection of the polymer melt into the mold 119.

The present invention has been reduced to practice by the construction of various apparatus wherein a retaining member is provided, having an internal diameter of ½ inch and a depth of ½ inch. The plunger member was formed with a diameter of ½ inch and both the plunger and the cup like retainer were heated by electrical resistance heaters, having a power output of approximately 100 watts.

A central rod like extension, projecting from the plunger, was provided having a diameter of ⅛ inch and was positioned so that the rod like projection extended to within approximately 1/16 inch from the bottom of the cup like retaining member. The plunger and the rod like projection were rotated at approximately 100 rpm by a 1/50 hp. electric motor.

Cold polymer material was introduced into the cup like retaining portion of this apparatus and was melted and mixed according to the procedure described above. The treated polymer material was then injected into a mold to form a miniature tensile specimen. The injection pressure required was approximately 600 psi and the time required to melt, mix and inject the material was less than 30 seconds. These results demonstrate that the present invention may be practiced to minimize the time of exposure of a polymer material to heat, whereby any tendency to degrade the material, due to heating is correspondingly minimized. Likewise, since the apparatus herein described requires a minimum of injection pressure, the degradation of the material, due to pressure, is also minimized. The inherent simplicity of the method and apparatus of the present invention, coupled with the associated short cycling period, provides a economy of installation and operation, heretofore impossible.

Although the above described test apparatus was of a relatively small size, there is no inherent limitation as to the size of the apparatus.

Other experiments have been performed to verify the principles of this invention. For example:

1. The apparatus described above was charged simultaneously with cold pellets of green colored polystyrene and cold pellets of red polystyrene. The material was then mixed and melted in accordance with the procedures described above and injected into a mold. The resulting molded product had a uniform brown color. If thorough mixing had not taken place, the product would have had red and green sections or streaks.

2. Cold ethyl cellulose pellets, saturated with moisture, were introduced into the apparatus, mixed and melted as described above and injected into a mold. The molded product was clear and free from bubbles. If the moisture had not escaped during the volatile removal portion of the cycles discussed above, the molded product would have been formed with bubbles. In conventional injection molding, it is well known in the art that ethyl cellulose must be pre-dried before introduction into an injection molding machine in order to avoid this bubble formation. This experiment therefore demonstrates that the present invention eliminates a costly additional operation when working feed materials such as ethyl cellulose.

3. The apparatus, described above, was charged with cold pellets of polystyrene and the above described cycle was commenced. At the point where the polystyrene was well mixed and melted, the plunger was moved away from the bottom of the cup like retainer and was held in this position while the apparatus was cooled. The polymer material, being worked within the apparatus, was recovered from the cup like retainer and was found to, in fact, present the geometric shape shown in FIG. 5. This, thereby, demonstrates that the "normal force effect" was indeed producing the "climb" as described above.

4. Various common polymer materials were processed in apparatus as described above, including polyethylene, poly (methyl, methacylate), polypropylene, etc. The results of the testing indicated that all the various non-homogeneous feed materials introduced into the apparatus were easily mixed and molded as discussed above. In addition, the apparatus has been successfully used to compound fillers such as calcium carbonate and reinforcing agents such as glass fibers into polymeric materials. The results of such testing fully demonstrates that the common practice of pre-mixing and compounding, prior to the introduction of the material into an injection molding machine, is not necessary when the teachings of the present invention are practiced.

5. Additionally, equipment according to the present invention has been used to prepare polymer blends, for example, blends of polyethylene and polystyrene or polypropylene and ethyl cellulose, by the simple feeding of the two different polymer materials into the apparatus and blending the materials by heating and mixing the polymer constituents according to the teachings of the present invention.

DIFFERENCE BETWEEN THE PRESENT INVENTION AND EXISTING METHODS OF APPARATUS

The present invention differs from plunger injection molding, discussed in the "Field of the Invention" portion of this specification, in that the transporting and force producing element (the plunger) is heated and rotated. Likewise, the present invention differs from screw injection molding in that the very expensive screw arrangement, thereof, is obviated so as to considerably reduce the cost of construction and the complexity of operation.

In the present invention, rotary shearing of the polymer material is used to impart a mixing and melting function. Rotary shearing has been used in the prior art, for example, in a process known as "the rotating shear cone injection molding system" and "the elastic melt extruder."

In the "rotating shear cone injection molding system" the polymer material is forced against a rotating cone and, thereby, is forced to flow radially outwardly into a separate reservoir from which the material is then forced into a mold, by means of a separate injection pump. It should be noted that this system differs from the present invention in that the mixing and melting of the feed material takes place in a separate machine element from that used for the injection step. In addition, this system differs from the present invention in that the flow of the material from the rotary shear zone is in a direction extending radially outwardly rather than radially inwardly as in the present invention.

Many attempts have been made to adapt the mixing and melting characteristics of the "elastic melt extruder" set forth in U.S. Pat. No. 3,046,603, to injection molding. In the elastic melt extruder, the polymer material being continuously extruded is rotationally sheared between a stationary surface and a rotating surface in a manner somewhat similar to the shearing action between the face of the rotatable plunger and the bottom of the cup like retainer of the present invention.

Prior art dealing with the application of the "elastic melt extruder" to injection molding includes: (U.S. Pat. No. 3,137,034 issued to Adams; U.S. Pat. No. 3,262,154 issued to Valyi; U.S. Pat. No. 3,295,165 issued to Wallace; U.S. Pat. No. 3,301,933 issued to Plymale; U.S. Pat. No. 3,355,764 issued to Moyer; U.S. Pat. No. 3,405,210 issued to Heider; French Pat. No. 1,461,514 issued to Prus; West German Pat. No. 1,185,366 issued to Meizner; West German Pat. No. 1,257,418 issued to V.E.B.; and British Pat. No. 1,064,937 issued to Peca Machinery.)

The apparatus and methods disclosed in all the above cited references differ substantially from the apparatus and method, embodied in the present invention, in several ways. In particular, in the prior art, the polymer material is not entrapped in the cup like retaining portion of the apparatus during the melting and mixing step as is the material in the present invention.

In all the prior art, a feed hopper is always in open communication with the mixing and melting shear zone of the apparatus. The sealing off of the rotary shear zone of the present invention, by having the plunger enter into the cup like retaining portion of the apparatus at a point beyond the feed hopper opening, entraps the material which entrapment, in turn, permits the application of substantial pressure to the polymer material, while it is being sheared, to improve the adhesion of the polymer material to the operative surfaces of the rotatable plunger and the associated cup like retaining member.

SOME ADVANTAGES OF THE PRESENT INVENTION

It can thus be seen that a method and apparatus have been herein provided which solve many of the problems confronting the plastic industry.

More particularly, it can be seen that the apparatus and method of the present invention provide a decided improvement in the field of injection molding, using non-homogeneous feed materials. The apparatus and method of the present invention require a minimum of elements and steps in an injection molding operation so as to be more economical than existing injection molding methods and equipment.

The apparatus according to the present invention is uniquely rugged and sufficiently uncomplicated as to require a minimum of skill for the proper operation thereof. Consequently, a corresponding minimum of training is required to prepare the personnel practicing the inventive method or utilizing equipment embodying the present invention.

Since the method and apparatus of the present invention contemplates the simultaneous heating and mixing of non-homogeneous feed materials, under high pressure with the automatic venting or unwanted volatile substances, the time required for forming plastic pieces may be greatly reduced.

SCOPE OF THE INVENTION

While several embodiments of the present invention have been set forth in the preceding detailed description, it is, of course, understood that various modifications and changes may be made therein without departing from the invention. It is therefore intended to cover in the following claims all such modifications and changes as may fall within the true spirit and scope of the present invention.

I claim:

1. Apparatus for use in mixing and working plastic materials comprising a cylindrical chamber, a cylindrical plunger closing one end of said chamber and movable axially within said chamber into and out of contact with material in said chamber, means for effecting relative rotation between said plunger and chamber with respect to each other to mix and work material within said chamber, an exit port in the end of the chamber opposite to said plunger, a cylindrical rod-like member of substantially smaller diameter than said plunger extending axially of and being axially displaceable with respect to said plunger while being held axially fixed within said cylindrical chamber, means for rotating said rod-like member to cause material in said chamber to flow axially along said rod-like member when said plunger is moved in a direction away from said exit port and to be folded back upon itself when said plunger is advanced toward said exit port to aid in mixing and working the material.

2. Apparatus as defined in claim 1 wherein means are provided for heating said chamber and plunger.

3. Apparatus as defined in claim 1 wherein means are provided for moving said plunger toward said exit port in said chamber to discharge material from said chamber through said exit port.

4. Apparatus as defined in claim 1 wherein said exit port is provided with valve means controlling the flow of material therethrough.

5. Apparatus as defined in claim 1 wherein said exit port communicates with an injection mold for the purpose of forming the shape of the material.

* * * * *